United States Patent [19]

Bolander

[11] 4,012,127
[45] Mar. 15, 1977

[54] MAGNIFYING ATTACHMENT FOR TELEPHONE BUTTONS AND THE LIKE

[76] Inventor: Lawanda Charleen Bolander, 4230 Wiedenmann Place, Kansas City, Mo. 64111

[22] Filed: Sept. 17, 1975

[21] Appl. No.: 614,004

[52] U.S. Cl. .............................. 350/243; 197/102; 350/114
[51] Int. Cl.² ..................... G02B 7/02; B41V 5/12; B41V 5/16
[58] Field of Search .......................... 350/243–244, 350/114–115, 245, 252; 235/145 R; 197/102–104; 178/110

[56] References Cited
UNITED STATES PATENTS

| | | | |
|---|---|---|---|
| 1,823,130 | 9/1931 | Smith | 235/145 R |
| 2,509,833 | 5/1950 | Miller | 350/243 |

Primary Examiner—John K. Corbin
Assistant Examiner—Wm. H. Punter
Attorney, Agent, or Firm—Fishburn, Gold & Litman

[57] ABSTRACT

A magnifying attachment for use on push buttons such as those on a more modern telephone and having an image magnifying element to magnify indicia imprinted or otherwise located on a button. The attachment has a depending skirt with the magnifying element secured thereto with the skirt being sized and shaped to receive the upper end of the button therein in frictional engagement for securing the magnifying element in overlying relation to the end surface of the button. The attachment also includes an upwardly extending peripheral rib to provide protection for the magnifying element and prevent an operator's finger from slipping from the attachment and contacting an adjacent button.

6 Claims, 5 Drawing Figures

MAGNIFYING ATTACHMENT FOR TELEPHONE BUTTONS AND THE LIKE

On more modern telephones commonly called "touch-dial" telephones and other devices, such as the miniaturized calculators, there are a number of buttons which are pushed to effect operation. Such buttons have indicia imprinted or otherwise located on an end thereof and because of the small size of the buttons the indicia is also small and difficult to read. To assure that the operator of the telephone pushes the right button, it is necessary that he be able to easily read the indicia imprinted thereon. This invention relates to a magnifying attachment for use on such buttons to magnify the indicia on the buttons making same easier to read and facilitate operation of the device having the buttons thereon.

The principal objects of the present invention are: to provide a magnifying attachment for use on push buttons such as those found on more modern telephones to magnify the indicia imprinted on the ends thereof; to provide such an attachment that can be easily installed on existing equipment having push buttons; to provide such an attachment with means to protect a magnifying element and prevent slippage of an operator's finger from the attachment and contacting an adjacent button; to provide each an attachment that can be molded as an integral structure from a transparent material such as plastic or glass; to provide such an attachment which substantially magnifies indicia to be read with a minimum of distortion thereof for easy reading; to provide such an attachment which is inexpensive and simple to manufacture and that can be installed easily on existing push buttons; and to provide such an attachment which is well adapted for its intended use.

Other objects and advantages of the present invention will become apparent from the following detailed description taken in connection with the accompanying drawings wherein are set forth by way of illustration and example certain embodiments of the present invention.

Figure 1:
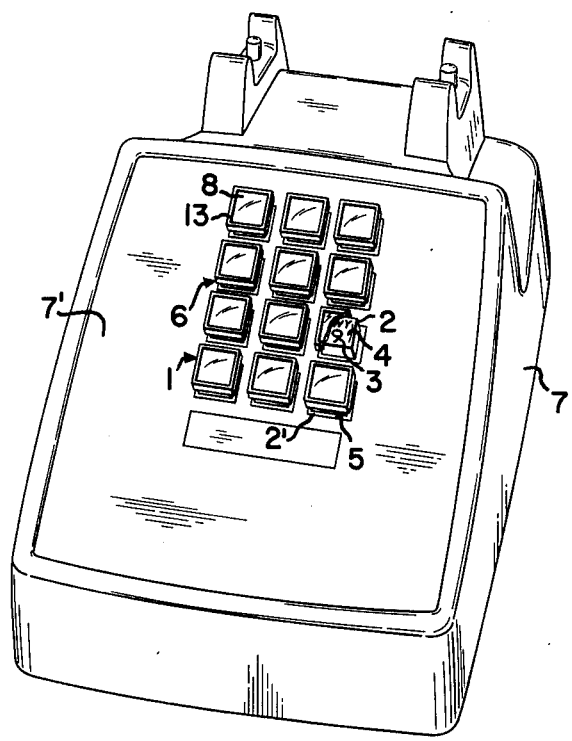
FIG. 1 is a perspective view of a telephone having a keyboard with magnifying attachments mounted on the push buttons thereof.
Figure 2:
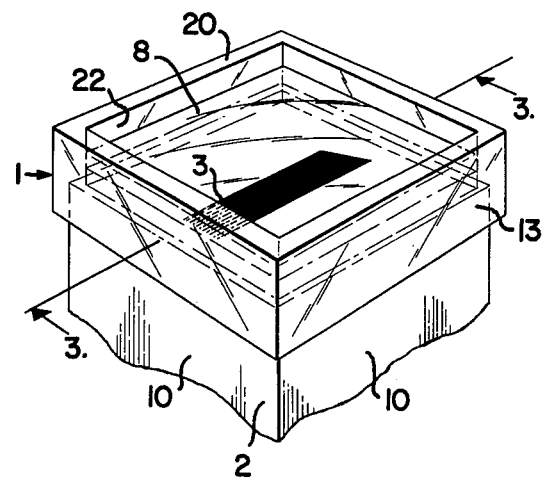
FIG. 2 is an enlarged perspective view of a magnifying attachment mounted on a push button.
Figure 3:
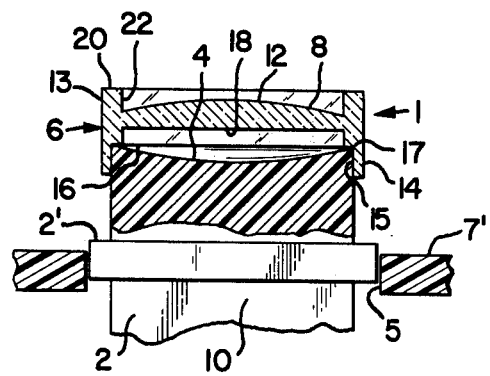
FIG. 3 is a section view of the push button and magnifying attachment taken along the line 3—3, FIG. 2.
Figure 4:
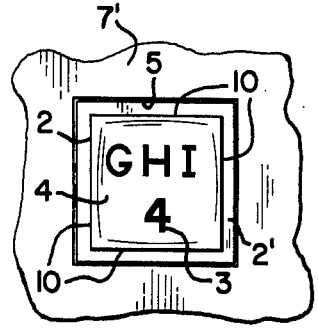
FIG. 4 is a plan view of a push button showing same as found in prior art.
Figure 5:
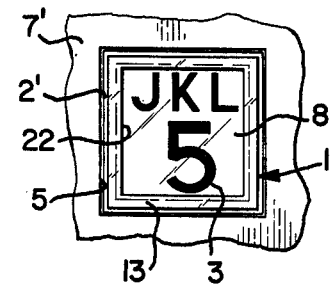
FIG. 5 is a plan view of a push button having a magnifying attachment thereon shown at the same scale as FIG. 4 to illustrate the magnification.

As required, detailed emobidments of the invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

The reference numeral 1 designates generally a magnifying attachment for use on a push button 2 to magnify indicia 3 imprinted or otherwise located on an end or face 4 of push button 2. The attachment 1 is provided with means 6 to mount the attachment on the end of the push button 2 for operation of same. The push button 2 can be of any suitable type such as those found on a more modern telephone 7, but it is to be understood that the push button may be on any suitable device including electronic calculators and the like. On today's electronic equipment, small push buttons are common and have indicia imprinted on the ends thereof to show what function the button performs. Because of the small size of the equipment and also the push buttons, indicia imprinted thereon is normally small and difficult to read. The attachment 1 has an image magnifying element 8 in overlying relation to the end 4 to magnify the indicia 3 so as to make same earier to read.

The push button 2 can be of any suitable type and the type shown has a generally rectangular cross section defined by side surfaces 10. The end 4 is generally concave and has the indicia 3 imprinted thereon. The push buttons 2 are generally a plurality and mounted in a keyboard forming arrangement with the push buttons 2 being adjacent to and spaced apart from one another. The push button 2 illustrated has a flange or enlargement 2' which moves in an opening 5 in the housing 7' of the instrument or telephone 7.

The magnifying element 8 is of a shape or arrangement of faces providing the magnification which preferably is in the nature of two to three power and in the illustrated structure the element 8 has an upwardly facing generally convex surface 12. The mounting means 6 cooperates with the magnifying element 8 and the push button 2 to hold the magnifying element 8 in overlying relation to the end 4 and preferably spaced therefrom. The mounting means 6 includes a frame member 13 which has the magnifying element 8 suitably mounted therein. As shown the frame member 13 includes a depending skirt 14 extending around the periphery of the magnifying element 8 and has an interior surface 15 sized and shaped to grippingly receive the push button 2 therein. The skirt 14 and push button 2 cooperatively interengage to hold the attachment 1 in position on the push button 2. Such cooperative interengagment is preferably provided by the skirt 14 having some resiliency for a friction fit between the push button 2 and the skirt 14. The frame 13 and skirt 14 are smaller in outside dimensions than the flange 2' and opening 5 whereby the housing 7' may be removed without removing the button attachments 1.

The attachment 1 is suitably restrained from longitudinal movement downwardly on the push button 2 so as to maintain the magnifying element 8 in its proper position relative to the indicia 3 and to prevent the skirt 14 from interfering with full movement of the push button 2 for operation. As shown, a shoulder 16 extends inwardly from the surface 15 and engages an upper edge 17 of the push button 2. The shoulder 16 is spaced from an underface 18 of the magnifying element 8 so that when the shoulder engages the button end 4 said undersurface 18 is suitably spaced from the indicia for the desired magnification. The underface is illustrated as substantially flat.

The attachment 1 has a structure that protects and tends to prevent damage to the magnifying element 8. As shown, an upstanding ridge or rim 20 extends around the periphery of the magnifying element 8 and has an upper edge preferably positioned above the highest point of the convex surface 12. The rim 20 protects the magnifying element by reducing contact therewith by an operator's finger. The rim 20 also serves to provide a shoulder 22 for engagement with an operator's finger or the like, to prevent same from slipping off the attachment 1 and thereby reduce the possibility of accidentally pushing the wrong push button 2. It is to be noted that the magnifying element 8, frame 13 and rim 20 can be formed as an integral structure or the magnifying element 8 can be suitably secured within the frame 13. As an integral structure, the magnifying element 8, frame member 13 and rim 20 can be molded from a transparent or clear acrylic plastic, glass, or like material.

The present invention is more fully understood by a description of the operation thereof. The attachment 1 is adapted to be mounted on push buttons 2 of existing equipment or can be installed at the factory on new equipment and as such the frame 13 is sized and shaped to receive the push button 2 within the skirt 14 for frictional engagement therebetween for mounting of the attachment 1. After mounting, the magnifying element 8 is in overlying relation to the end 4 and magnifies the indicia 3 thereon to facilitate operation of the push button 2. The engagement of the skirt 14 and periphery of the button 2 prevents entry of dust and the like, however, if the button face 3 or element face 18 should become dirty or clouded the attachment can be pulled off for cleaning and then replaced on the button for further use.

It is to be understood that while I have illustrated and described certain forms of my invention, it is not to be limited to the specific form or arrangement of parts herein described and shown.

I claim:

1. A magnifying attachment for use on push buttons such as those used on a touch dial telephone and the like, said attachment including:
  a. a transparent image magnifying member having a convex outer disposed surface;
  b. a peripheral skirt integral with and depending from said magnifying member for cooperative engagement with portions of a push button having indicia on an end thereof, said skirt mounting said magnifying member in overlying relation to said end and indicia for magnifying the indicia;
  c. a shoulder on the interior of said skirt and engageable with said button end to limit movement of said skirt onto said button and position said magnifying member relative to said indicia;
  d. an upstanding peripheral rib integral with and extending around said magnifying member and forming a shoulder for engagement with an operator's finger to prevent same from slipping off said magnifying member convex surface.

2. The attachment as set forth in claim 1 wherein:
  a. said cooperative engagement being frictional engagement;
  b. said magnifying member, skirt and rib being formed by a molding process from a transparent material.

3. A magnifying attachment for use on push buttons such as those used on touch-dial telephones and the like, said attachment including:
  a. a transparent image magnifying member
  b. a frame member having said magnifying member mounted therein, said frame member having a portion thereof for cooperative engagement with portions of a push button having indicia on an end thereof for mounting said magnifying member in overlying relation to said indicia and magnifying same;
  c. said magnifying member having a convex upper surface; and
  d. peripheral upstanding means on said frame and extending outwardly of said convex upper surface of said magnifying member for engagement by an operator's finger to protect the magnifying member therefrom and to prevent slippage from said magnifying member.

4. The attachment as set forth in claim 3 wherein:
  a. said frame member portion includes a depending skirt having an interior surface for frictionally engaging exterior surface portions of said button whereby the frictional engagement retains said frame member and magnifying member on said button.

5. The attachment as set forth in claim 4 including:
  a. shoulder forming means on said frame member for engaging an upper edge of said button and limiting movement of same on said button and positioning said magnifying member relative to said button end; and wherein
  b. said magnifying member has a generally convex outer disposed surface with said upstanding means including a rib around the periphery of said magnifying member.

6. The attachment as set forth in claim 5 wherein:
  a. said frame member, magnifying member and upstanding means being integral and formed of a transparent material.

* * * * *